(12) United States Patent
Li et al.

(10) Patent No.: US 8,493,742 B2
(45) Date of Patent: Jul. 23, 2013

(54) PUSH-BUTTON SWITCH ASSEMBLY AND ELECTRONIC DEVICE WITH SAME

(75) Inventors: Min-Li Li, Shenzhen (CN); Bao-Gang Zhao, Shenzhen (CN); Yong-Jun Yu, Shenzhen (CN); Na Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 237 days.

(21) Appl. No.: 13/053,292

(22) Filed: Mar. 22, 2011

(65) Prior Publication Data

US 2012/0057314 A1    Mar. 8, 2012

(30) Foreign Application Priority Data

Sep. 30, 2010 (CN) .......................... 2010 1 0272139

(51) Int. Cl.
*H05K 5/00* (2006.01)
*H01H 3/12* (2006.01)
*H01H 13/14* (2006.01)

(52) U.S. Cl.
USPC .......................................... 361/752; 200/341

(58) Field of Classification Search
None
See application file for complete search history.

(56) References Cited

U.S. PATENT DOCUMENTS

| | | | | |
|---|---|---|---|---|
| 5,617,301 | A * | 4/1997 | Sato et al. | 361/796 |
| 6,140,595 | A * | 10/2000 | Yao | 200/344 |
| 6,239,726 | B1 * | 5/2001 | Saida | 340/999 |
| 6,781,071 | B2 * | 8/2004 | Leng et al. | 200/61.54 |
| 6,809,278 | B2 * | 10/2004 | Tsubaki | 200/341 |
| 7,019,225 | B2 * | 3/2006 | Matsumoto et al. | 200/5 R |
| 7,214,896 | B2 * | 5/2007 | Yamaguchi | 200/314 |
| 7,235,754 | B2 * | 6/2007 | Rochon et al. | 200/406 |
| 7,355,138 | B2 * | 4/2008 | Chou | 200/341 |
| 7,525,056 | B2 * | 4/2009 | Chiba et al. | 200/314 |
| 7,557,318 | B2 * | 7/2009 | Osada | 200/314 |
| 7,576,291 | B2 * | 8/2009 | Tseng et al. | 200/296 |
| 7,714,243 | B2 * | 5/2010 | Birdwell | 200/341 |
| 7,990,731 | B2 * | 8/2011 | Guo et al. | 361/753 |
| 8,130,214 | B2 * | 3/2012 | Aimi et al. | 345/184 |
| 2004/0140190 | A1 * | 7/2004 | Searle et al. | 200/341 |
| 2005/0219230 | A1 * | 10/2005 | Nakayama et al. | 345/173 |
| 2006/0000699 | A1 * | 1/2006 | Sasaki et al. | 200/341 |
| 2007/0017792 | A1 * | 1/2007 | Chiu et al. | 200/341 |
| 2008/0060926 | A1 * | 3/2008 | Zadesky et al. | 200/341 |
| 2008/0277254 | A1 * | 11/2008 | Chen | 200/341 |
| 2008/0308396 | A1 * | 12/2008 | Matsumoto et al. | 200/341 |
| 2009/0159416 | A1 * | 6/2009 | Tseng et al. | 200/341 |
| 2009/0201655 | A1 * | 8/2009 | Watanabe | 361/781 |
| 2009/0301853 | A1 * | 12/2009 | Yang et al. | 200/343 |

* cited by examiner

Primary Examiner — Hoa C Nguyen
Assistant Examiner — Xanthia C Cunningham
(74) Attorney, Agent, or Firm — Altis Law Group, Inc.

(57) ABSTRACT

An electronic device includes a casing, a PCB, a push-button switch assembly, and a protective member. The push-button switch includes a push-button disposed on the casing and a switch disposed on the PCB. When pressed, a main body of the push-button moves towards the PCB to actuate the switch. The protective member is disposed between the main body and the PCB for restricting further movement of the main body as the switch is actuated.

19 Claims, 5 Drawing Sheets

PUSH-BUTTON SWITCH ASSEMBLY AND ELECTRONIC DEVICE WITH SAME

BACKGROUND

1. Technical Field

The present disclosure relates to electronic devices, in particular, to an electronic device having a push-button switch assembly.

2. Description of Related Art

Many electronic devices include a push-button switch assembly for users to operate or control the electronic device. When the push-button is pressed, a switch is activated to carry out a switching operation. When the push-button is released, a restoring mechanism will return the push-button to its initial position. However, users may press the button too hard and too long which can damage the button and associated mechanisms.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
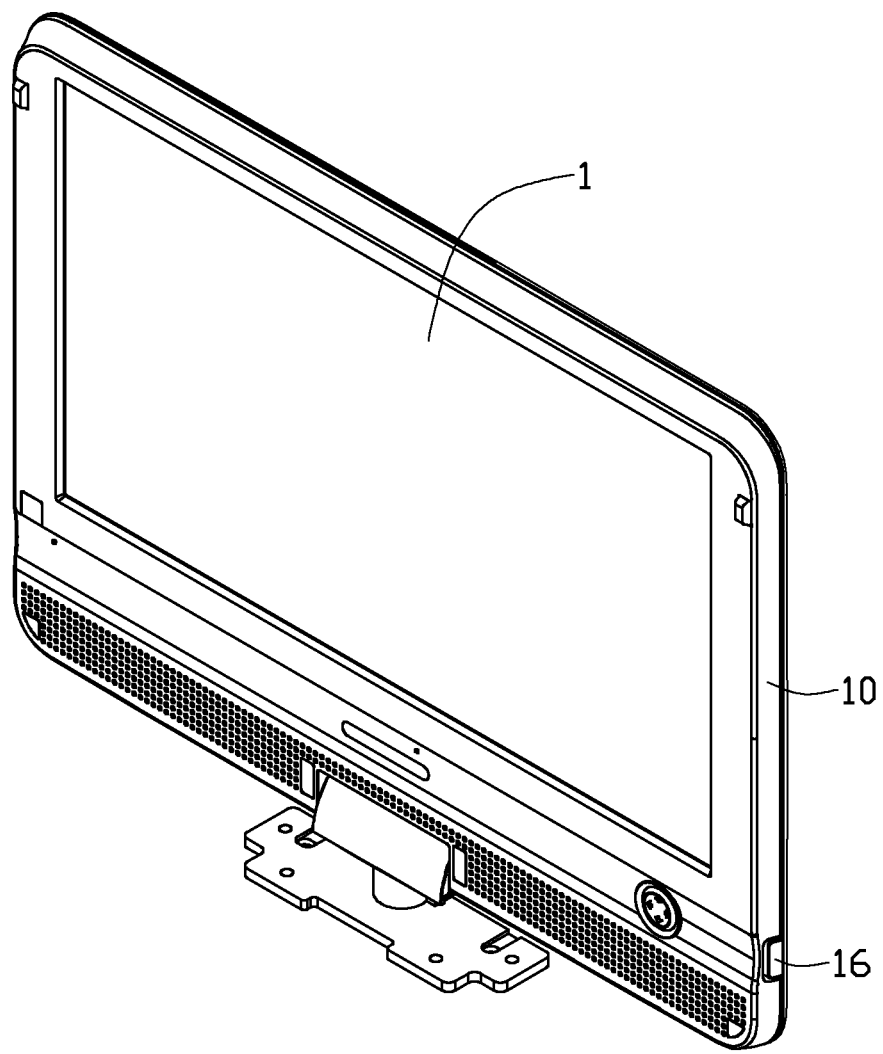
FIG. 1 is a schematic view of an electronic device according to an embodiment of the present disclosure, and the electronic device includes a push-button switch assembly, a casing, and a printed circuit board.

Referring to FIG. 1, an electronic device 1 in an embodiment may include a casing 10 for accommodating a display panel and a push-button switch assembly 16 mounted on the casing 10 for activating an application of the electronic device 1. The electronic device 1 may be a display of an optical disc player. In other embodiments, the electronic device 1 may be some other devices such as a personal digital assistant device or a tablet computer.

Figure 2:
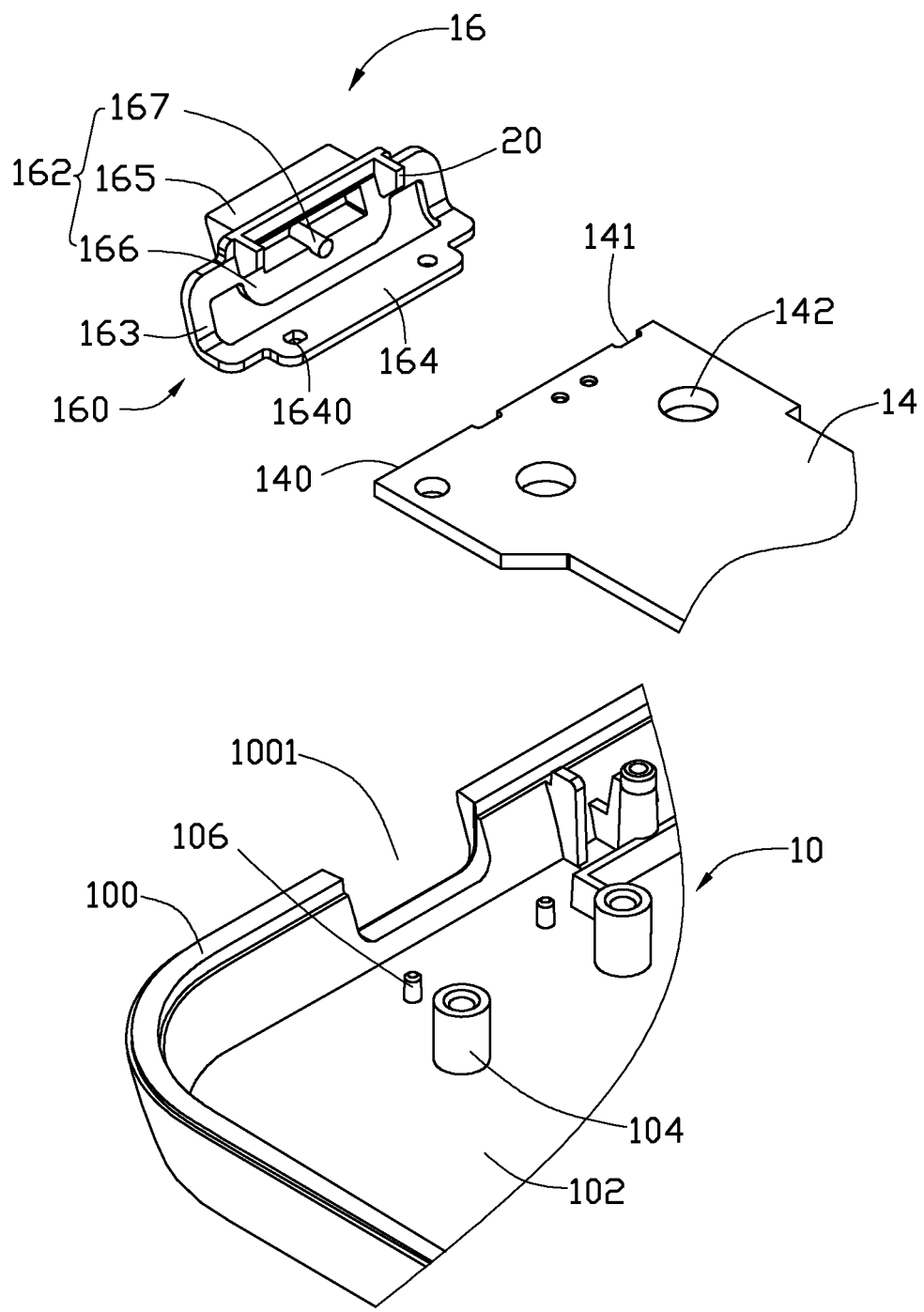
FIG. 2 is a partially exploded view of the electronic device of FIG. 1.
Figure 3:
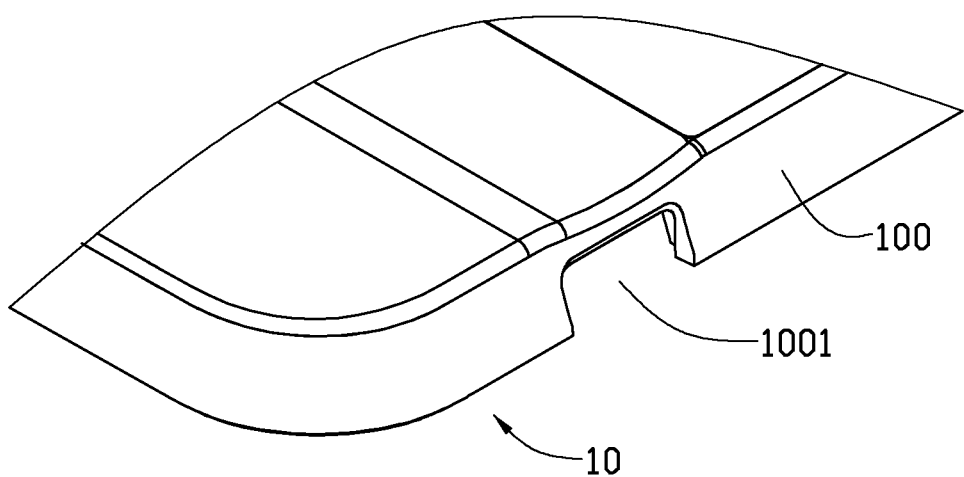
FIG. 3 is similar to FIG. 2 but from a reverse angle.
Figure 3:
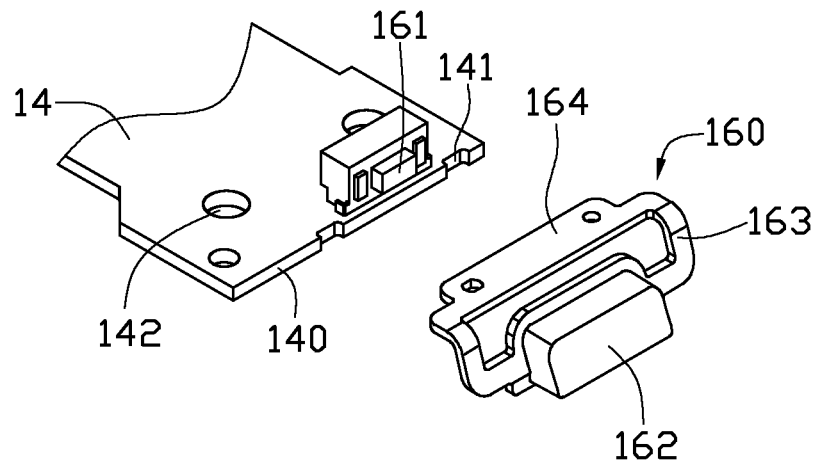

Referring to FIGS. 2 and 3, the electronic device 1 further includes a printed circuit board (PCB) 14 disposed within the casing 10. The casing 10 may include a base 102 and a sidewall 100 extending perpendicularly from an edge of the base 102. An opening 1001 communicating with the interior space of the casing 10 is defined in the sidewall 100. Two connection posts 104 and two connection pins 106 protrude out from an interior surface of the base 102, and the pins 106 are located between the posts 104 and the opening 1001.

The PCB 14 is parallel to the base 102 and defines two through holes 142 to receive the posts 104. Two slots 141 are defined on an end portion 140 of the PCB 14, adjacent to the opening 1001.

Figure 4:
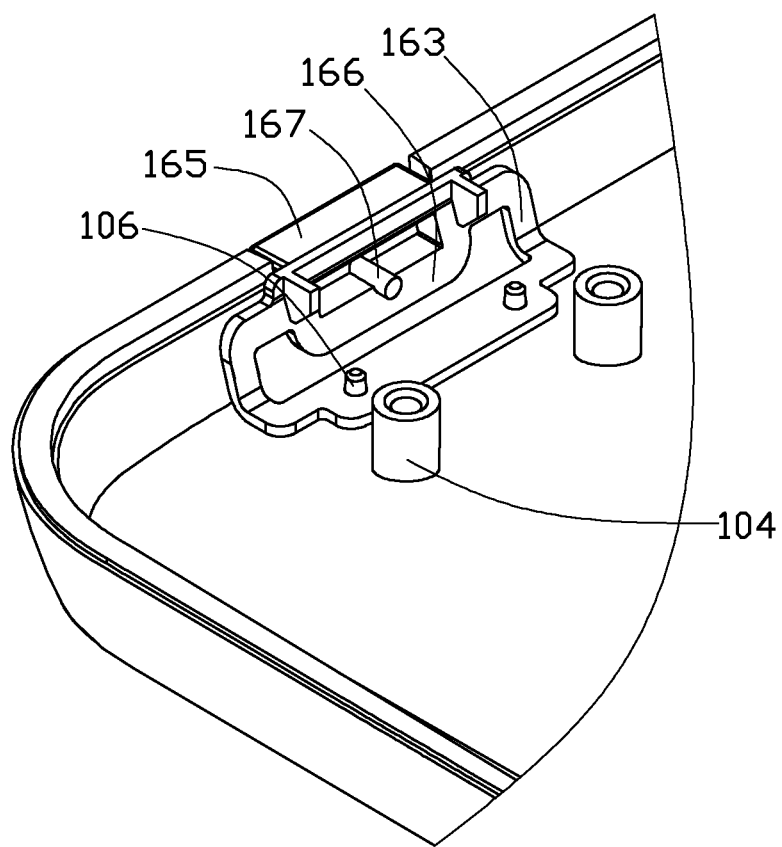
FIG. 4 is a schematic view showing the engagement between the push-button switch assembly and the casing of FIG. 1.
Figure 5:
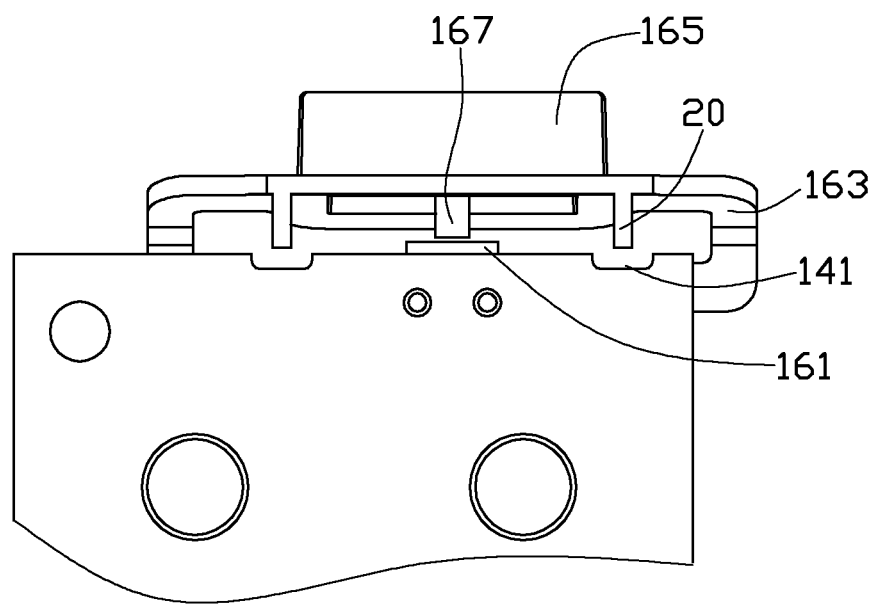
FIG. 5 is a schematic view showing the engagement between the push-button switch assembly and the printed circuit board of FIG. 1.

Referring further to FIG. 4, the switch assembly 16 may include a switch 161 and a push-button 160 for actuating the switch 161. In the embodiment, the switch 161 is disposed on a surface, which is parallel to the base 102, of the PCB 14 and faces the opening 1001.

The push-button 160 includes a main body 162 slidably disposed in the opening 1001 for depressing the switch 161, a fixing member 164 fixed to the two connection pins 106, and two elastic arms 163 connecting the push-button 162 to the fixing member 164. The fixing portion 164 is parallel to the base 102. The two elastic arms 163 are connected to a side, which is adjacent to the opening 1001, of the fixing member 164, and are perpendicular to the base 102. The main body 162 is disposed on the sidewall 100 and partly received in the opening 1001. The elastic arms 163 are configured to restore the main body 162 to its initial position as the pressing force is removed. The fixing member 164 is generally rectangular and defines two through holes 1640 corresponding to the connection pins 106.

The main body 162 may include a key top 165, a combination portion 166, a contact portion 167 for contacting the switch 161, and two protective members 20 cooperating with the PCB 14 to protect the switch 161. The key top 165 is slidably disposed within the opening 1001 and used for being pressed by users. The combination portion 166 is disposed on one side of the key top 165 and received in the interior space of the electronic device 1. The contact portion 167 protrudes out from the combination portion 166 along a direction from the key top 165 to the switch 161 and corresponds to the switch 161.

The protective members 20 are disposed between the key top 165 and the PCB 14, and correspond to the slots 141.

The PCB 14 is arranged parallel to the depressing direction of the push-button 160 and acts as a stop member for restricting further movement of the protective members 20 and the main body 162 after the switch 161 is actuated by the push-button 160 to protect the switch 161 from damage caused by excessive force applied to the push-button 160. In an embodiment, each protective member 20 is a block extending from one side of the combination portion 166 opposite to the key top 165 along a direction parallel to the contact portion 167.

In assembly, the PCB 14 is put on the interior surface of the base 102 with the through holes 142 receiving the connection posts 104. In this state, the end portion 140 of the PCB 14 is adjacent to the opening 1001; the switch 161 faces the contact portion 167 and is spaced from the contact portion 167 at a first distance; and the bottom portion of each slot 141 faces corresponding protective member 20 and is spaced from the corresponding protective member 20 at a second distance. The second distance is longer than the first distance. Then, with the connection pins 106 engaging in the through holes 1640, the fixing member 164 is fixed to the interior surface of the base 102 to fix the push-button switch 16 to the casing 10. At this time, the elastic arms 163 and the combination portion 166 abut against the interior surface of the sidewall 100. The key top 165 is partly received in the opening 1001 and exposed on the outer surface of the sidewall 100.

In use, the key top 165 is pressed by users so that the push-button switch assembly 16 can activate an application of the electronic device 1.

As the key top 165 slides in the opening 1001, the combination portion 166 and the contact portion 167 are driven toward the PCB 14 in a direction parallel to the PCB 14, until the contact portion 167 depresses the switch 161, during which time the elastic arms 163 are deformed to generate a restoring force for the main body 162. When the deformation of the switch 161 reaches a determinate value, the switch 161 is actuated. The deformation of the switch 161 has a critical point.

To prevent deformation of the switch 161 exceeding the critical damage value, the second distance is longer that the first distance. Therefore, the protective members 20 do not contact the bottom portion of corresponding slot 141. The main body 162 restores to its initial position immediately after the pressing force is removed by virtue of the restoring force from the elastic member 163.

If users keep applying the pressing force to the main body 162 after the switch 161 is actuated, the contact portion 167 will keep depressing the switch 161 in the direction parallel to the PCB 14, and each protective member 20 will keep moving towards the end portion 140 of the PCB 14 as well until abutting the bottom portion of corresponding slot 141. As a result, the main body 162 is restricted from moving further towards the PCB 14 because of the engagement between the protective members 20 and the slots 141, which ensures the deformation of the switch 161 to be less than the critical point. Because the pressing force on the key top is changed to be perpendicular to the PCB 14, it is unlikely that excessive force applied to the push-button 160 will cause the PCB 14 to break away from or damage the casing 10.

With the protective members 20 and the PCB 14 forming a protective structure, further movement of the main body 162 after the switch 161 is actuated is restricted so that damage from excessive force applied to the switch 161 can be avoided.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device, comprising:
a casing;
a push-button switch assembly comprising a switch disposed in the casing and a push-button for actuating the switch; the push-button comprising a main body movably disposed on the casing, wherein when the main body is depressed, the main body moves towards the switch and depresses the switch to actuate the switch;
wherein the main body comprises a key top, a contact portion for contacting the switch as the key top is pressed and at least one protective member, the at least one protective member projects out from a surface of the key top opposite to the switch; when the main body is further depressed after the switch is actuated, the at least one protective member moves with the main body for restricting further movement of the main body as the switch is actuated so as to protect the switch from damage caused by excessive force applied by the push-button.

2. The electronic device as claimed in claim 1, further comprising a stop member disposed in the casing, wherein the stop member is used for stopping the movement of the main body as the switch is actuated.

3. The electronic device as claimed in claim 2, wherein the stop member comprises a printed circuit board, and the switch is disposed on the printed circuit board.

4. The electronic device as claimed in claim 3, wherein when the switch is actuated, the at least one protective member abuts the printed circuit board to stop the movement of the main body.

5. The electronic device as claimed in claim 4, wherein the printed circuit board defines at least one slot corresponding to the at least one protective member.

6. The electronic device as claimed in claim 5, wherein the main body is spaced from the switch at a first distance, the at least one protective member is spaced from a bottom portion of the corresponding slot at a second distance, and the second distance is longer than the first distance.

7. The electronic device as claimed in claim 1, wherein the at least one protective member projects towards an end portion of the printed circuit board with the slots defined thereon.

8. The electronic device as claimed in claim 1, wherein the casing defines an opening, and the main body is slidably disposed in the opening.

9. The electronic device as claimed in claim 8, wherein the push-button comprises at least one elastic arm for connecting the main body to the casing, the at least one elastic arm restores the main body to original position as the pressing force is removed.

10. An electronic device, comprising:
a casing for accommodating a display panel;
an electronic circuit board;
a push-button switch assembly comprising a switch disposed on the electronic circuit board and a push-button corresponding to the switch, wherein when the push-button is depressed, the push-button depresses the switch, and the switch is deformed and actuated; and
at least one protective member corresponding to the electronic circuit board;
wherein the electronic circuit board is arranged parallel to the depressing direction of the push-button; when the push-button is further depressed after the switch is actuated, the at least one protective member is capable of moving along the direction parallel to the electronic circuit board and abutting the electronic circuit board for preventing the deformation of the switch from exceeding a critical point so as to protect the switch from damage.

11. The electronic device as claimed in claim 10, wherein the push-button comprises a main body being capable of moving towards the electronic circuit board, the at least one protective member protrudes out from the main body towards to the electronic circuit board.

12. The electronic device as claimed in claim 11, wherein an end portion of the electronic circuit board defines two slots corresponding to the at least one protective member, and the at least one protective member is spaced from a bottom portion of the corresponding slot at a second distance.

13. The electronic device as claimed in claim 12, wherein the main body is spaced from the switch at a first distance, the second distance is longer than the first distance.

14. A push-button switch assembly, comprising:
a push-button;
a switch disposed on a printed circuit board of an electronic device;
the push-button comprising a main body being capable of moving towards the printed circuit board to contact the switch under a pressing force applied thereto;
at least one elastic member for restoring the main body; and
a protective member being disposed on the main body;
wherein the main body moves a first distance to abut the printed circuit board under the pressing force applied thereon; the protective member moves in a second distance to abut the printed circuit board under the pressing force applied to the main body for engaging with the printed circuit board to restrict further movement of the main body towards the printed circuit board as the switch is actuated by the main body so as to protect the switch from damage caused by excessive force applied by the push-button.

15. The push-button switch assembly as claimed in claim 14, wherein the second distance is longer than the first distance.

16. The push-button switch assembly as claimed in claim 14, wherein the printed circuit board defines at least one slot corresponding to the protective member.

17. The push-button switch assembly as claimed in claim 16, wherein the main body comprises a key top for being pressed and a contact portion for contacting the switch as the key top is pressed.

18. The push-button switch assembly as claimed in claim 17, wherein the protective member projects out from the key top towards an end portion of the printed circuit board with the slots defined thereon.

19. The push-button switch assembly as claimed in claim 17, wherein the switch faces the contact portion and is spaced from the contact portion at the first distance; the protective member is spaced from a bottom portion of the corresponding slot at the second distance.

* * * * *